United States Patent [19]

Taniyama

[11] Patent Number: 5,515,968
[45] Date of Patent: May 14, 1996

[54] STORAGE CONTAINER HAVING AN IMPROVED HUB FOR GRIPPING AN OPTICAL DISK

[76] Inventor: Yoshihiko Taniyama, 9380 Old Southwick Pass, Alpharetta, Ga. 30202

[21] Appl. No.: 259,058

[22] Filed: Jun. 13, 1994

[51] Int. Cl.[6] .......................... B65D 85/57; B65D 85/30
[52] U.S. Cl. ........................ 206/310; 206/308.1
[58] Field of Search ................... 206/309, 310, 206/311, 312, 313, 444, 493, 308.1

[56] References Cited

U.S. PATENT DOCUMENTS

| | | | |
|---|---|---|---|
| D. 318,368 | 7/1991 | Evans | D3/35 |
| 4,084,690 | 4/1978 | Pulse | 206/310 |
| 4,535,888 | 8/1985 | Nusselder | 206/444 |
| 4,702,369 | 10/1987 | Philosophe | 206/312 |
| 4,793,480 | 12/1988 | Gelardi et al. | 206/312 |
| 4,819,799 | 4/1989 | Nomula et al. | 206/310 |
| 4,874,085 | 10/1989 | Grobecker et al. | 206/309 |
| 4,895,252 | 1/1990 | Nomula et al. | 206/310 |
| 4,903,829 | 2/1990 | Clemens | 206/310 |
| 5,101,971 | 4/1992 | Grobecker | 206/232 |
| 5,135,106 | 8/1992 | Morrone | 206/310 |
| 5,253,751 | 10/1993 | Wipper | 206/45.19 |
| 5,263,580 | 11/1993 | Ciba et al. | 206/309 |
| 5,269,409 | 12/1993 | Brandt et al. | 206/309 |
| 5,284,243 | 2/1994 | Gelardi et al. | 206/310 |
| 5,284,248 | 2/1994 | Dunker | 206/444 |
| 5,310,084 | 5/1994 | Stumpff et al. | 206/310 |

FOREIGN PATENT DOCUMENTS

| | | |
|---|---|---|
| 0420350A1 | 9/1990 | European Pat. Off. . |
| 205589 | 8/1990 | Japan . |
| 2243145 | 10/1991 | United Kingdom . |

Primary Examiner—Paul T. Sewell
Assistant Examiner—Tara L. Laster
Attorney, Agent, or Firm—Troutman Sanders; Joel S. Goldman; John A. Savio, III

[57] ABSTRACT

The present invention relates to a compact disk enclosure having an improved mounting hub for engaging a centralized hole in a compact disk. The hub may be molded directly onto base for securing the disk thereon, or alternatively, the hub may be molded into a tray which is adapted to be inserted and secured to the base portion of the enclosure. In a preferred embodiment, the hub engages substantially an entire circumference of the centralized disk hole. The hub structure generally includes cylindrical wall extending upward from a base portion of the enclosure. A plurality of radial slits extend radially outward from a center of the cylindrical wall for dividing the cylindrical wall into gripping teeth for engaging the centralized disk hole.

9 Claims, 5 Drawing Sheets

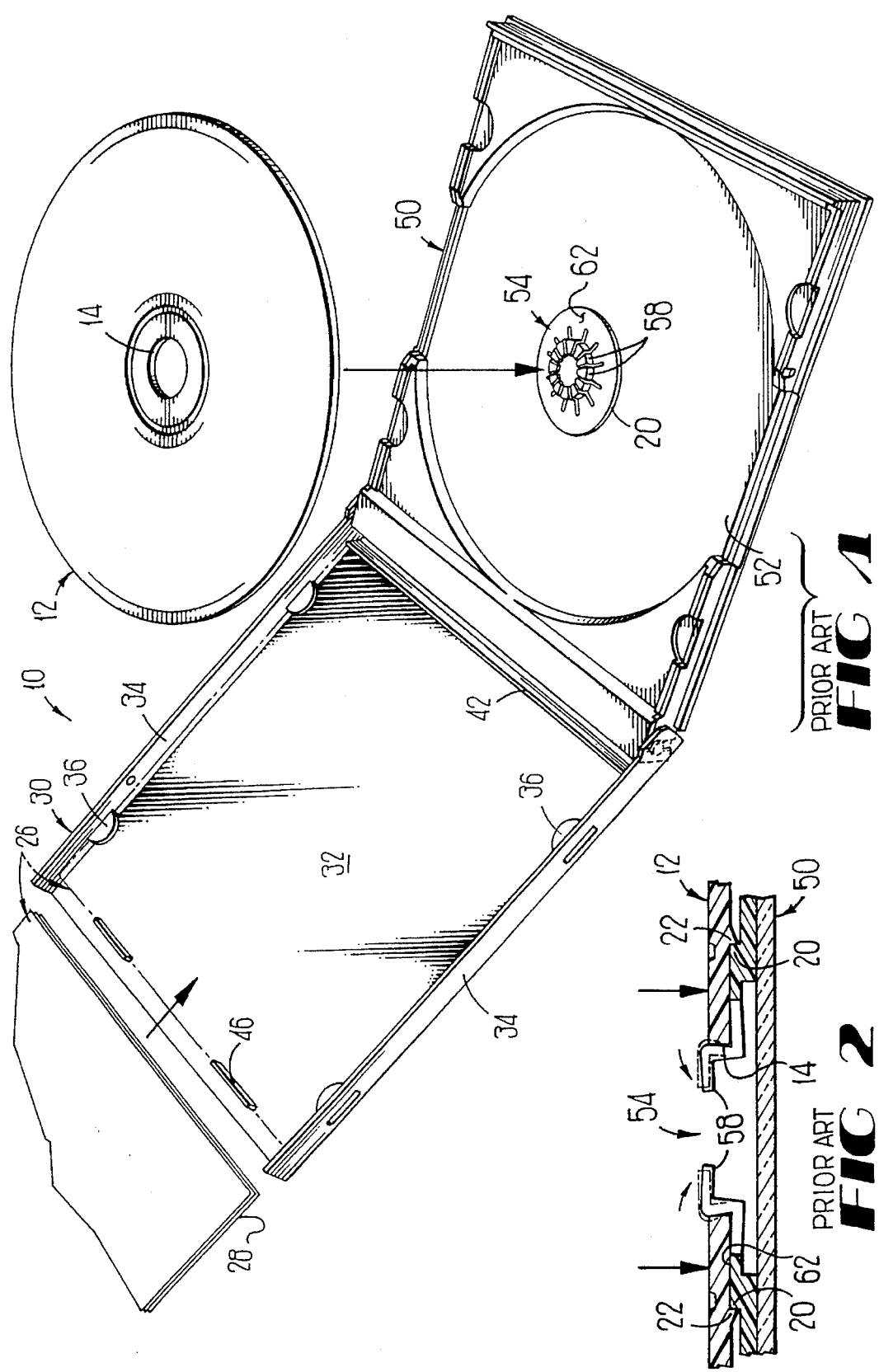
PRIOR ART FIG. 1
PRIOR ART FIG. 2

5,515,968

STORAGE CONTAINER HAVING AN IMPROVED HUB FOR GRIPPING AN OPTICAL DISK

BACKGROUND OF THE INVENTION

1. Field of the Invention

This invention relates generally to an enclosure for compact disks. More specifically, the present invention relates to an improved mounting hub structure within the enclosure which engages a centralized hole within a compact disk.

2. Description of the Prior Art

FIG. 1 illustrates a prior art storage container 10 preferably formed of a transparent, plastic material. The container 10 is formed of two main components, a base tray 50 and a cover 30.

The cover 30 includes two side walls 34 which extend perpendicularly from a top surface 32. From each side wall 34 one or more side tabs 36 protrude inwardly. The side tabs 36 are positioned a sufficient distance from the top surface 32 to allow for the insertion of a booklet or card 26 between the tabs 36 and the top surface 32. The booklet or card 26 may thus be viewed through the top surface 32 of the cover 30. The booklet or card 26 may be inserted, with its graphics side 28 facing the top surface 32, into the cover 30 from an open front end 44 of the cover 30 and slid under the tabs 36 until it rests against a rear ledge 42 of the cover 30. Small front tabs 46 protrude upwardly from a portion of the inside surface of the cover 30 adjacent its front end 44 of the cover 30 to keep the booklet or card 26 in place once it rests against the rear ledge 42.

As illustrated in FIGS. 1 and 2, the conventional base tray 50 includes a disk seat 62 and a conventional mounting hub 54, which are formed integrally with a bottom surface 52 of the base tray 50 (preferably by molding). The mounting hub 54 includes a plurality of small gripping teeth 58 for radially engaging the centralized hole 14 of compact disk 12. The centralized hole 14 of the disk 12 is adapted to be mounted and secured to the conventional mounting hub 54 using an interference fit. As illustrated in FIG. 2, when the disk is mounted over conventional hub 54, gripping teeth 58 are deflected radially inward and resiliently engage centralized hole 14. When disk 12 is mounted on conventional hub 54, annular ridge 22 matingly engages ridge 20 on disk seat 62 to center disk 12 on hub 54.

Many manufacturing and product performance problems have been associated with conventional hub 54. Since conventional hub 54 includes at least twelve radial gripping teeth 58, the size of each tooth is extremely small and therefore difficult to mold. Intricate molds must be constructed for conventional hub 54 at considerable cost. Additionally, when the base tray 50 is injected molded, many defects are associated with the gripping teeth 58 due to the difficulty of filling the minute cavities within the mold which form the gripping fingers. Furthermore, since the gripping teeth are relatively small as compared to other structures within the container 10, cyclic stresses associated with repeated mounting and dismounting of the disk 12 from conventional hub 54 often causes the small conventional gripping teeth 58 to break off from the tray.

SUMMARY OF THE INVENTION

The present invention recognizes and addresses the foregoing disadvantages, and others of prior art constructions and methods.

Accordingly, it is an object of the present invention to provide an enclosure for securing a compact disk or the like which is durable, aesthetically pleasing, and inexpensive to manufacture.

It is another object of the present invention to provide a mounting hub structure within a compact disk enclosure which effectively engages a centralized hole within a compact disk.

It is yet another object of the present invention is to provide a hub structure comprised of radial gripping teeth for engaging a centralized hole of a compact disk.

Still another object of the present invention is to provide gripping teeth within a hub of a compact disk enclosure which are larger than conventional gripping teeth.

Still another object of the present invention is to provide gripping teeth which form a hub within a compact disk enclosure that can withstand cyclic lateral deflection associated with repeated mounting and dismounting of compact disk therefrom.

Still another object of the present invention is to provide gripping teeth which form a hub within a compact disk enclosure that are molded without defects and inexpensive to produce.

Finally, another object of the present invention is to reduce the number of gripping teeth needed to form a hub within a compact disk enclosure, and therefore simplify the hub and the process of its manufacture.

These and other objects are achieved by the present invention.

Generally speaking, the present invention relates to an enclosure having a base and a cover hingedly connected the base for protecting and securing an optical disk therein. More specifically, the present invention relates to a mounting hub within the enclosure which engages a centralized hole in a compact disk. The hub may be molded directly onto base for securing the disk thereon, or alternatively the hub may be molded into a tray which is adapted to be inserted and secured to the base portion of the enclosure.

In a preferred embodiment, the hub engages substantially an entire circumference of the centralized disk hole. The hub structure generally includes a cylindrical wall extending upward from the base. A plurality of radial slits extend radially outward from a center portion of the cylindrical wall for dividing the cylindrical wall into circumferential sections. Each of the circumferential sections are defined as resilient gripping teeth between pairs of adjacent slits.

In the preferred embodiment, the gripping teeth are larger and fewer in number than teeth in conventional hubs. An inclusive angle between radial edges of each tooth, as measured from the center of the cylindrical wall, may vary between approximately 120 and approximately 60 degrees, depending upon the number of gripping teeth that are utilized in the mounting hub. Generally, it has been found that from three to six teeth work most effectively in the improved hub according to the present invention.

In an alternative embodiment of the present invention, the hub structure generally includes cylindrical wall having inner and outer surfaces extending upward from a surface within the base tray. A plurality of radial slits are formed in the base tray and extend radially outward from a center of the cylindrical wall for dividing the cylindrical wall into circumferential sections, and the base tray surface into radial sections. In this embodiment, additional circumferential wall sections may be disposed between gripping teeth. Furthermore, circumferential slit segments are formed in the base tray surface, are located radially within a location of each tooth, and are disposed between radial edges of each tooth, such that the circumferential slits may intersect the radial slits near radial edges of each tooth. The resulting structure is a substantially U-shaped slit formed in the base tray surface which surrounds each tooth, and allows a portion of the base tray to deflect with radial displacement of each tooth. In this embodiment, an inclusive angle between said radial edges of each said tooth, as measured from the center of the cylindrical wall is between approximately 115 and approximately 35 degrees. Finally, this embodiment may utilize three to six gripping teeth to form the hub.

In an additional embodiment of the present invention, the enclosure may include a gripping hub comprised of a plurality of accurate gripping teeth extending upward from the base tray for resiliently engaging the centralized hole of the disk, wherein the teeth are radial disposed around a central point on the base tray. Each tooth may include two radial edges, an inner wall, and an outer gripping surface. This embodiment may also include a substantially U-shaped slit formed in the base tray surface surrounding each tooth, which allows a portion of the base tray to deflect with radial displacement of each tooth, thereby increasing radial tooth flexibility. In this embodiment, an inclusive angle between said radial edges of each said tooth, as measured from the center of the cylindrical wall is between approximately 115 and approximately 35 degrees. Finally, this embodiment may utilize three to six gripping teeth to form the hub.

Other objects, features and aspects of the present invention are discussed in greater detail below.

BRIEF DESCRIPTION OF THE DRAWINGS

The accompanying drawings illustrate the preferred embodiment of the invention, and serve to aid in the explanation of the principles of the invention in which:

FIG. 1 is an exploded, open perspective view of a prior art compact disk enclosure illustrating a hub section comprising a plurality of small teeth for engaging a centralized hole within a compact disk;

FIG. 2 is an isolated cross sectional view of the prior art enclosure of FIG. 1 with a compact disk secured within the enclosure;

DETAILED DESCRIPTION OF THE INVENTION

Figure 3A:
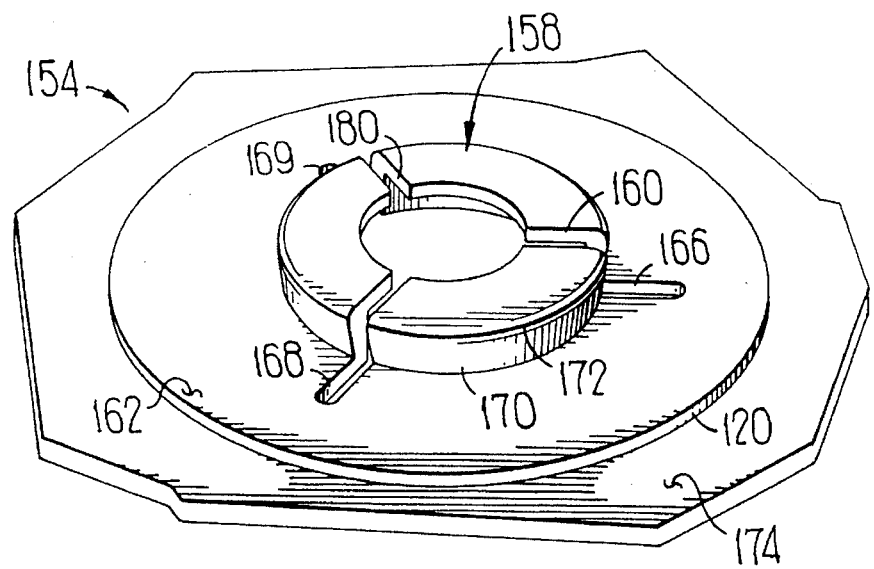
FIG. 3a is an isolated perspective view of a preferred embodiment of the present invention illustrating a hub portion comprised of three wedge-shaped teeth extending radially inward toward a central point spaced in close proximity to one another with radially extending slits separating each tooth.

A preferred embodiment of the present invention is illustrated in FIGS. 3a, 4a, 5a, and 6a. FIG. 3a illustrates an improved mounting hub 154 for a compact disk enclosure. The inventive hub according to the present invention is generally located in the same position as a prior art hub, such as conventional hub 54 as seen in prior art FIG. 1. Additionally, in a preferred embodiment, the inventive hub is molded integrally with an insert on the base tray of the enclosure, in a manner illustrated in prior art FIG. 2. In this particular embodiment, hub 154 is molded into a base tray surface 174. An annular ridge 120 is provided for centering a compact disk (not shown) onto the hub. Annular ridge 120 steps up to disk seat 162. Extending upward from disk seat 162 is mounting hub 154 which is essentially a vertical cylindrical section divided by slits 166, 168, and 169, which extend radially outward from a center point of mounting hub 154. Each radially adjacent pair of radial slits in the mounting hub defines gripping tooth 158 therebetween. Each gripping tooth has radial edges 160 and 180. A slight annular lip 172 is disposed on an upper edge of an outer wall 170 of mounting hub 154.

Figure 4A:
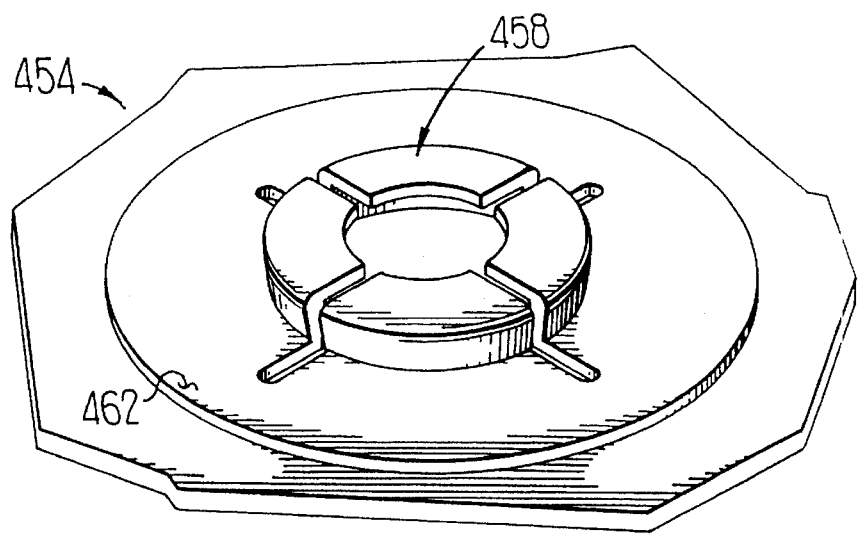
FIG. 4a is an isolated perspective view of the preferred embodiment of the present invention illustrating a hub portion comprised of four wedge-shaped teeth.
Figure 6A:
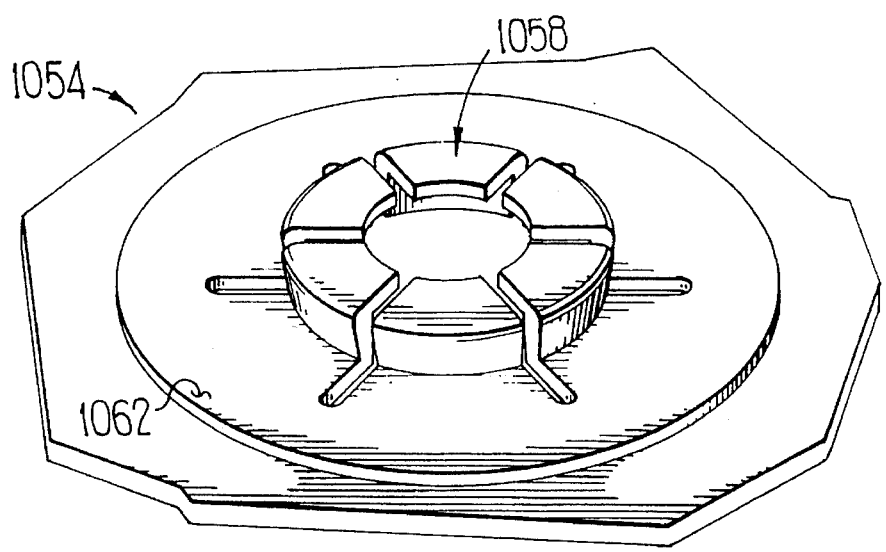
FIG. 6a is an isolated perspective view of the preferred embodiment of the present invention illustrating a hub portion comprised of six wedge-shaped teeth.

FIG. 3a illustrates a first example of the first embodiment where three gripping teeth 158 are arranged so as to form the cylindrical hub 154. Thus, the angular sweep of each tooth as measured from a geometric center of the hub 154 is approximately 120 degrees. Similarly, FIG. 4a illustrates a second example of the first embodiment illustrating mounting hub 454 including gripping teeth 458 extending upward from disk seat 462. Here, the gripping teeth 458 are disposed so as to form the hub 454 where the angular sweep of each tooth as measured from a geometric center of the hub 454 is approximately 45 degrees. Similarly, a third example of the first embodiment of the present invention illustrates in FIG. 5a hub 754 extending upward from disk seat 762 where each of the gripping teeth has an angular sweep of approximately 72 degrees. Finally, a fourth example of the first embodiment is illustrated in FIG. 6a where hub 1054 extends upward from disk seat 1062 and has six gripping teeth, wherein each tooth has an angular sweep of approximately 60 degrees.

As illustrated in the preferred embodiment, the hub engages substantially circumference of a centralized hole of a compact disk. In operation, the centralized hole of disk is slipped over the hub, and the radial slits allow each of the gripping teeth to collapse radially, since the annular lip has a slightly larger radius than the centralized hole of the disk. When the disk comes to rest on the disk rest, the annular lip at the top of the hub retains the disk on the hub, and the gripping teeth remain slightly radially displaced and therefore exert an outward radial force against substantially the entire centralized hole to retain the disk on the hub.

Figure 3B:
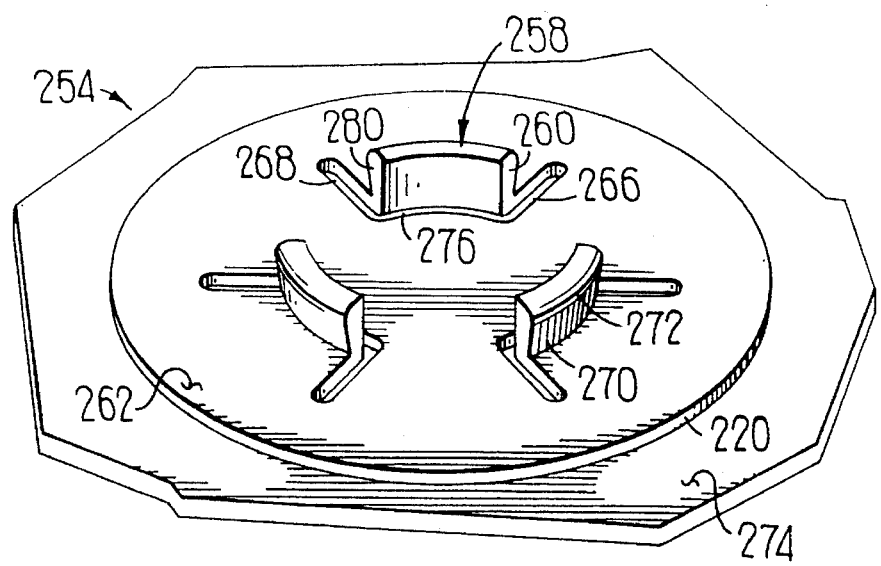
FIG. 3b is an isolated perspective view of a second embodiment of the present invention illustrating a hub portion comprised of three teeth spaced radially equidistant from one another, wherein a circumferential groove is disposed radially inward of each tooth, and radial grooves border lateral sides of each tooth.

FIGS. 3b, 4b, 5b, and 6b illustrate a second embodiment of the inventive mounting hub. More particularly, FIG. 3b illustrates a first example of the second embodiment where arcuate gripping teeth 258 extend upward from disk seat 262 on surface 274. The arcuate gripping 258 teeth are radially disposed from a central point hub 254 and have a radius of curvature on an outer wall 270 that is slightly greater than the radius of curvature within the centralized hole of the disk placed thereon. Disposed near each side of arcuate edges 260 and 280 are radial slits 266 and 268 which extend radially outward from a rear portion of gripping teeth 258. Additionally, a circumferential groove 276 is disposed along a inside portion of each tooth on disk seat 262 and intersects radial slits 266 and 268. Furthermore, annular lips 272 are disposed on an upper portion of the teeth 258.

Figure 4B:
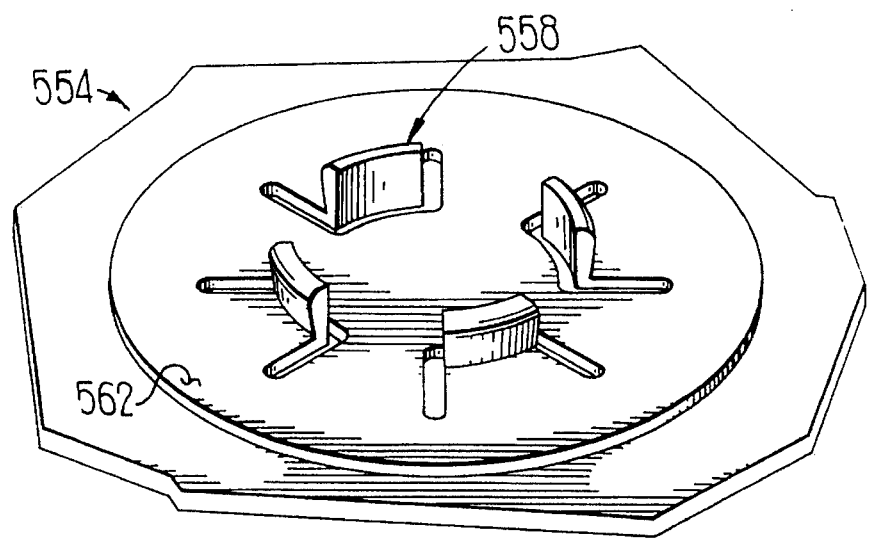
FIG. 4b is an isolated perspective view of the second embodiment of the present invention illustrating a hub portion comprised of four teeth.
Figure 5A:
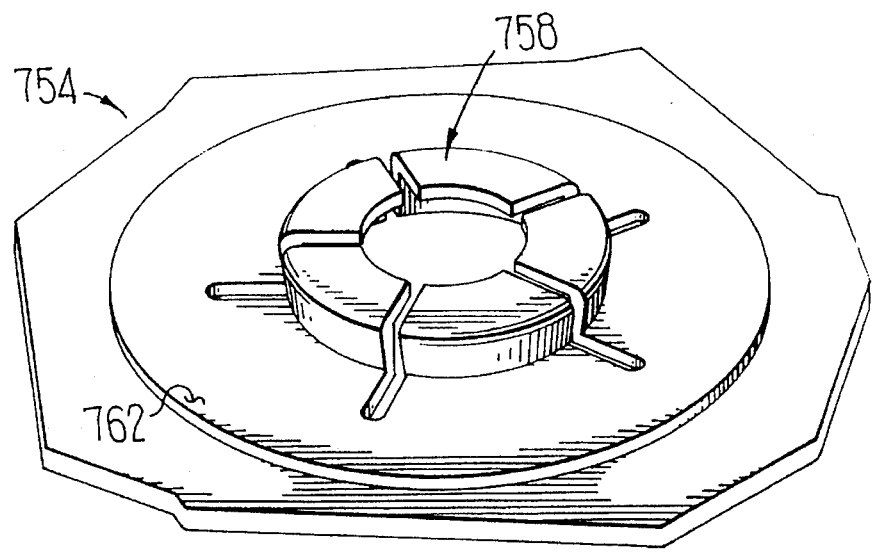
FIG. 5a is an isolated perspective view of the preferred embodiment of the present invention illustrating a hub portion comprised of five wedge-shaped teeth.
Figure 5B:
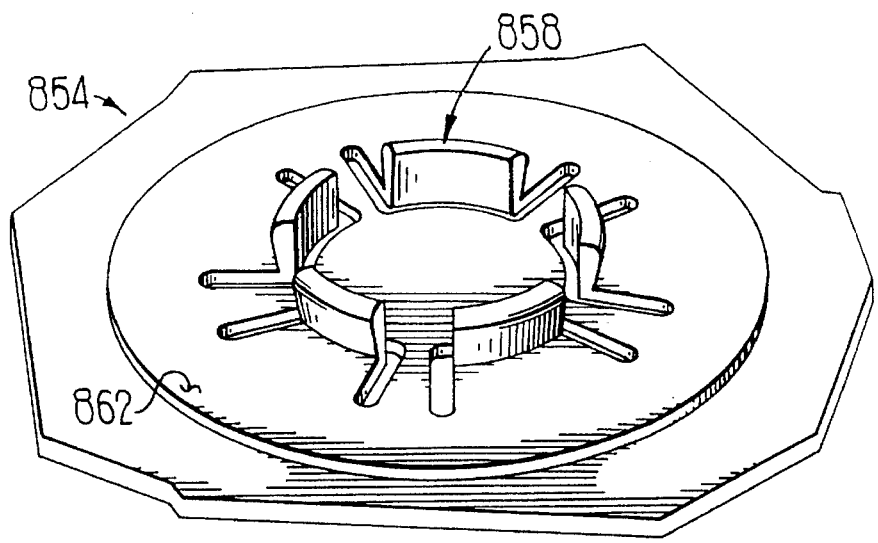
FIG. 5b is an isolated perspective view of the second embodiment of the present invention illustrating a hub portion comprised of five teeth.
Figure 6B:
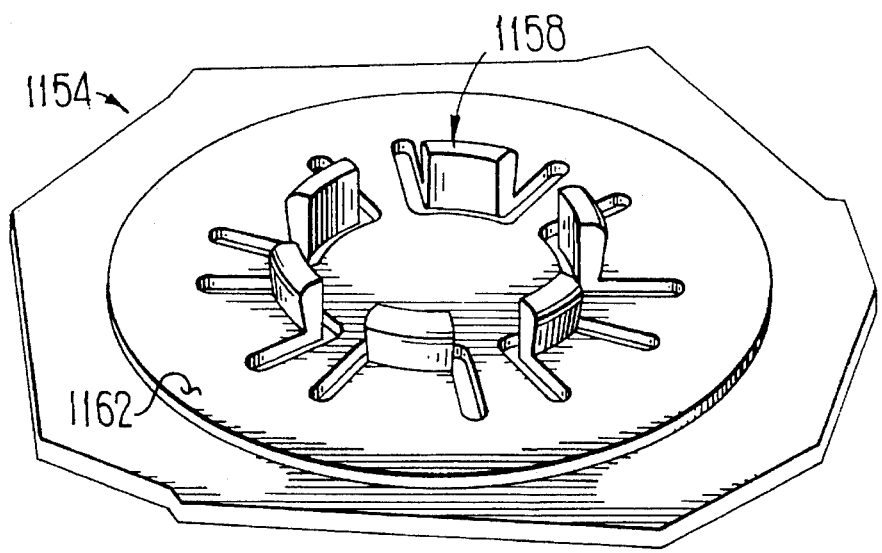
FIG. 6b is an isolated perspective view of the second embodiment of the present invention illustrating a hub portion comprised of six teeth.

FIG. 4b illustrates a second example of the second embodiment wherein the mounting hub 554 includes four teeth 558 disposed on disk seat 562. FIG. 5b represents a third example of the second embodiment of the present invention wherein hub 854 comprises five gripping teeth 858 which extend from disk seat 862. Finally, FIG. 6b represents a fourth example of the second embodiment where mounting hub 1154 includes six gripping teeth 1158 extending upward from disk seat 1162.

The second embodiment operates in a similar manner as the first embodiment. The centralized hole of disk is slipped over the hub, and the slits between each of the gripping teeth to collapse radially. When the disk comes to rest on the disk seat the annular lip at the top of the hub retains the disk on the hub, and the gripping teeth remain slightly radially displaced and therefore exert an outward radial force against portions of the centralized hole to retain the disk on the hub. It should also be noted the mounting hub according to the second embodiment of the present invention contains a solid center portion and that the circumferential and radial slits around each gripping tooth allows portions of the disk seat near an outside portion of each disk rest bend upwardly from radial displacement, thereby distributing stress more evenly from the gripping teeth to the disk seat. Furthermore, the angular sweep of each gripping tooth in the second embodiment, as measured from a center portion of the hub may be between 35 and 115 degrees, depending on the number of gripping teeth used in the hub.

Figure 3C:
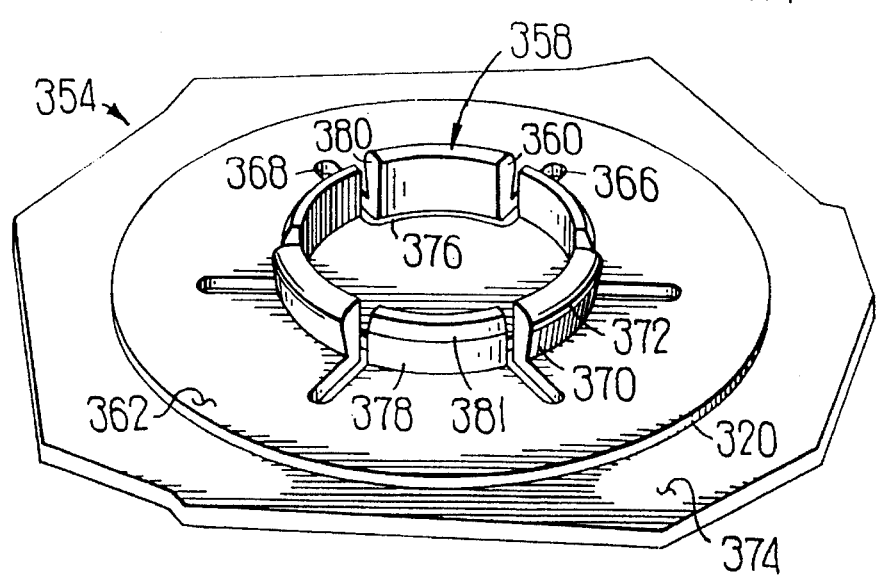
FIG. 3c is an isolated perspective view of a third embodiment of the present invention illustrating a hub portion comprised of three teeth spaced radially equidistant from one another, wherein a circumferential groove is disposed radially inward of each tooth, radial grooves border lateral sides of each tooth, and circumferential walls are disposed between each of the teeth.

FIGS. 3c, 4c, 5c, and 6c illustrate a third embodiment of the inventive mounting hub. More particularly, FIG. 3c illustrates a first example of the third embodiment where arcuate gripping teeth 358 extend upward from disk seat 362 on surface 374. The arcuate gripping 358 teeth are radially disposed from a central point within hub 354 and have a radius of curvature on an outer wall 370 that is slightly greater than the radius of curvature within the centralized hole of the disk placed thereon. Disposed near each side of arcuate edges 360 and 380 are radial slits 366 and 368 which extend radially outward from a rear portion of gripping teeth 358. Additionally, a circumferential groove 376 is disposed along a inside portion of each tooth on disk seat 362 and intersects radial slits 366 and 368. Furthermore, lip segments 372 are disposed on an upper portion of the teeth 358. Finally, circumferential wall segments 378 are disposed between each tooth for added disk stability and have a bevelled edge 381 to avoid wall edge contact with the disk when mounted onto hub 354. Each of the wall segments 378 are relatively rigid as compared to gripping teeth 358, having a radius slightly smaller than the centralized disk hole, and facilitate centering of the disk on the mounting hub.

Figure 4C:
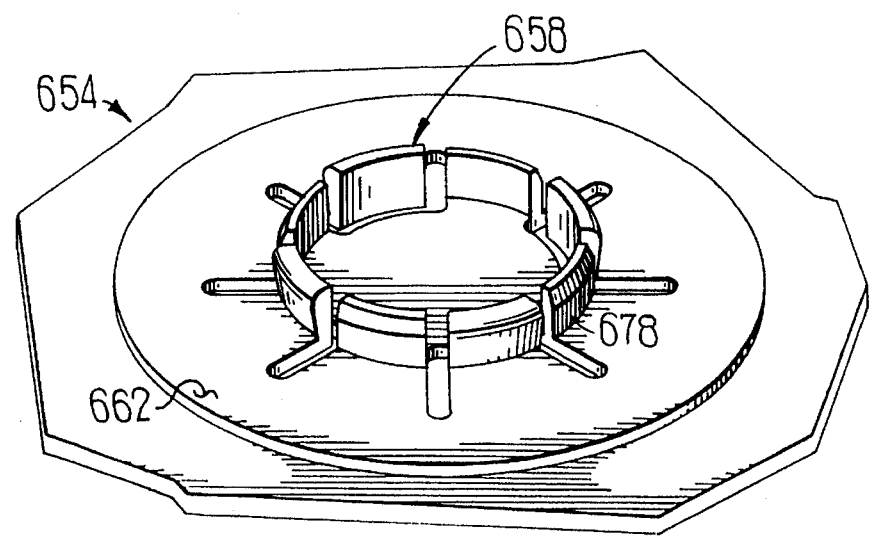
FIG. 4c is an isolated perspective view of the third embodiment of the present invention illustrating a hub portion comprised of four teeth.
Figure 5C:
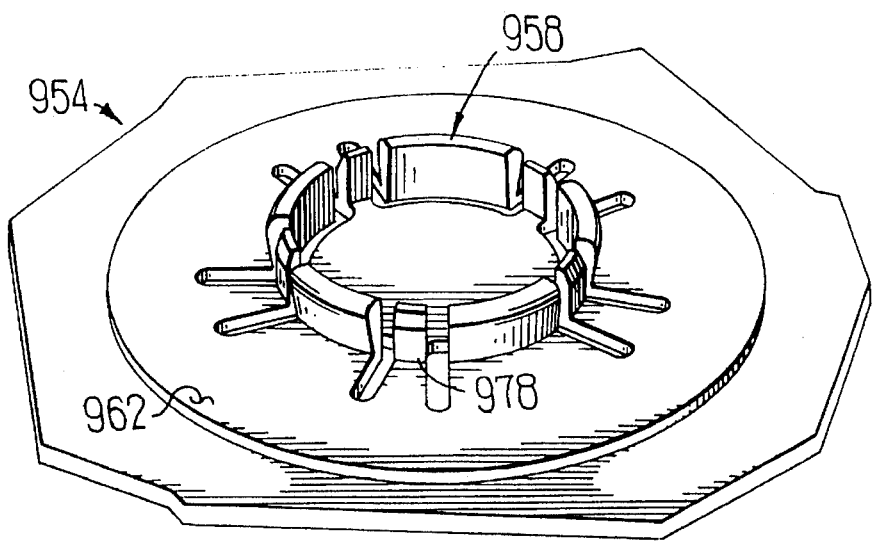
FIG. 5c is an isolated perspective view of the third embodiment of the present invention illustrating a hub portion comprised of five teeth.
Figure 6C:
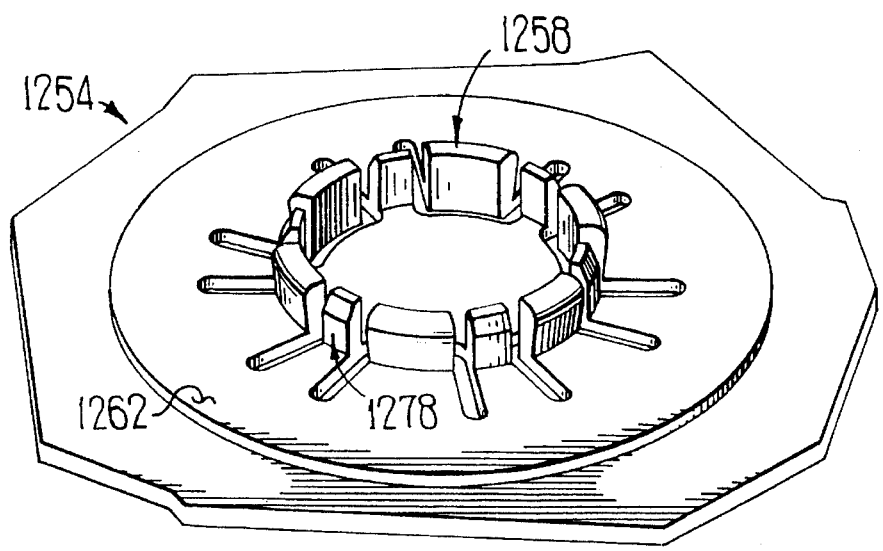
FIG. 6c is an isolated perspective view of the third embodiment of the present invention illustrating a hub portion comprised of six teeth.

FIG. 4c illustrates a second example of the third embodiment wherein the mounting hub 654 includes four teeth 658 disposed on disk rest 662. Additionally, circumferential walls 678 are disposed between each of the teeth. FIG. 5c represents a third example of the third embodiment of the present invention wherein hub 954 comprises five gripping teeth 958 which extend upward from disk seat 962. Additionally, circumferential walls 978 are disposed between each of the teeth. Finally, FIG. 6c represents a fourth example of the third embodiment where mounting hub 1254 includes six gripping teeth 1258 extending from disk rest 1262. Additionally, circumferential walls 1278 are disposed between each of the teeth.

The third embodiment operates in a similar manner to the second embodiment. The centralized hole of disk is slipped over the hub, and the slits allow each of the gripping teeth to collapse radially. When the disk comes to rest on the disk seat, the annular lip at the top of the hub retains the disk on the hub, and the gripping teeth remain slightly radially displaced and therefore exert an outward radial force against portions of the centralized hole to retain the disk on the hub. It should also be noted the mounting hub according to the second embodiment of the present invention contains a solid center portion and that the circumferential and radial slits around each gripping tooth allows portions of the disk seat near an outside portion of each disk rest bend upwardly from radial displacement, thereby distributing stress more evenly from the gripping teeth to the disk rest.

It should be understood that various changes to the present invention may be made by the ordinarily skilled artisan, without departing from the spirit and scope of the present invention which is presented in the claims below. For example, each of the gripping teeth in any of the above illustrated embodiments may have different radial sweeps with respect to one another. Additionally, each of the above illustrated mounting hubs may be molded into a base of an enclosure so as to comprise only one piece. Furthermore, each of the above-mentioned embodiments of the inventive hub may be first molded in to a tray piece and then fastened to a base portion to form a base tray for a compact disk enclosure. The ordinarily skilled artisan will also understand that this disclosure presents an example of the invention and is not meant to limit the invention, as presented in the claims, in any way whatsoever.

What is claimed is:

1. An enclosure for protecting and securing an optical disk having a centralized hole, said enclosure comprising:

a base adapted to house the disk therein;

a cover hingedly connected to said base; and a hub disposed on a surface of said base for securing the disk thereon, said hub including, a cylindrical wall having a geometrical center, said cylindrical wall extending upward from said surface, a plurality of vertical slits formed in said cylindrical wall, a plurality of radially resilient arcuate gripping teeth for radially engaging the centralized disk hole, each said tooth including an arcuate section of said cylindrical wall disposed between two circumferentially adjacent vertical slits, an annular lip comprising a protrusion disposed on an upper edge of said arcuate section for engaging a bottom edge of the centralized disk hole, wherein said annular lip is adapted to cause said tooth to move radially inward when the disk is placed on said hub, and said annular lip is adapted to resiliently engage a top edge of the centralized disk hole when the disk is placed over said hub, and thereby removably securing the disk onto said hub, first and second radial edges on each said tooth formed from said vertical slits, and first and second radial slits formed in said surface, extending radially outward from said first and second radial tooth edges and collinear with radii extending from said geometrical center, respectively, for increasing the radial flexibility of each said tooth, while transferring radial deflection of each said tooth to said surface between said radial slits extending from each said radial tooth edge;

wherein an inclusive angle between radial edges of each tooth, as measured from said geometrical center of said cylindrical wall, is between approximately 60 and approximately 120 degrees, whereby said inclusive angle provides sufficient stiffness in each said tooth to transfer radial tooth deflection from said arcuate cylindrical wall section of said tooth to said surface between radial slits extending from radial edges of each tooth.

2. The storage enclosure of claim 1 further comprising:

a tray adapted to be inserted and secured to said base, wherein said hub is disposed on a top surface of said tray.

3. The storage enclosure of claim 1 wherein said hub comprises:

circumferential wall sections disposed between circumferentially adjacent gripping teeth, and each said gripping tooth further including a circumferential groove extending through said surface, disposed radially inward of each said tooth and connecting said first and second radial slits near each said first and second tooth edges, wherein said first and second radial slits and said circumferential slit near each said tooth form a substantially U-shaped slit in said surface around each said tooth for increasing the radial flexibility of each said tooth.

4. The storage enclosure of claim 3, wherein a circumferential width of each said tooth is greater than a circumferential width of said circumferential wall sections.

5. The storage enclosure of claim 3, wherein a circumferential width of each said tooth is less than a circumferential width of said circumferential wall sections.

6. The storage enclosure of claim 3, wherein a circumferential width of each said tooth is approximately equal to a circumferential width of said circumferential wall sections.

7. The storage enclosure of claim 1 wherein said hub further comprises:

a top surface integrally molded with said cylindrical wall;

a plurality of top surface slits radially extending from said geometrical center of said cylindrical wall, wherein each said top surface slit is connected to a single said vertical slit on said cylindrical wall; and each said gripping tooth further including a wedge-shaped portion of said top surface between circumferentially adjacent top surface slits.

8. The storage enclosure of claim 3 wherein said circumferential wall sections include bevelled portions on a top portion thereof.

9. The storage enclosure of claim 1 wherein said hub further comprises:

a circumferential groove extending through said surface disposed radially inward of each said gripping tooth and connecting said first and second radial slits near each said first and second tooth edges, wherein said first and second radial slits and said circumferential slit near each said tooth form a substantially U-shaped slit in said surface around each said tooth for increasing the radial flexibility of each said tooth, and for transferring radial deflection of each said tooth to said surface between said radial slits extending from each said radial tooth edge.

* * * * *